United States Patent
Wakai

Patent Number: 5,468,107
Date of Patent: Nov. 21, 1995

[54] SPLIT NAIL

[75] Inventor: Takao Wakai, Higashiosaka, Japan

[73] Assignee: Wakai & Co., Ltd., Osaka, Japan

[21] Appl. No.: 302,320

[22] Filed: Sep. 8, 1994

[30] Foreign Application Priority Data

Feb. 3, 1994 [JP] Japan .................................. 6-011696

[51] Int. Cl.⁶ .................................................. F16B 15/04
[52] U.S. Cl. .............................. 411/448; 411/78; 411/75; 411/358
[58] Field of Search ..................... 411/2, 54, 75, 411/79, 447, 446, 487, 922, 80, 358, 357

[56] References Cited

U.S. PATENT DOCUMENTS

| | | | |
|---|---|---|---|
| 806,186 | 12/1905 | Rasmussen | 411/357 |
| 3,974,621 | 8/1976 | Stang | 411/75 |
| 4,797,046 | 1/1989 | Ollivier et al. | 411/448 |
| 4,892,450 | 1/1990 | Gerhard | 411/79 |

FOREIGN PATENT DOCUMENTS

| | | | |
|---|---|---|---|
| 1015402 | 9/1952 | France | 411/448 |
| 115195 | 8/1968 | Norway | 411/358 |

*Primary Examiner*—Peter M. Cuomo
*Assistant Examiner*—Tuyet Pham
*Attorney, Agent, or Firm*—Wenderoth, Lind & Ponack

[57] ABSTRACT

Long and short legs have heads and pointed tips, respectively. They are joined together near their tips by welding. An upper portion above the welded portion of the long leg is formed with a cut extending obliquely upwards toward the short leg so that a thin breakable portion is formed in the long leg between the end of the cut and the contact surface with the short leg. A washer for clamping the legs above the cut is provided. When the nail is driven, the legs will not spread until the head of the short leg abuts the washer. When the head abuts the washer, the long leg slides outwards and spreads apart from the short leg near the cut. The breakable portion will thus get broken and the nail will spread.

3 Claims, 4 Drawing Sheets

FIG. 1A
FIG. 1B
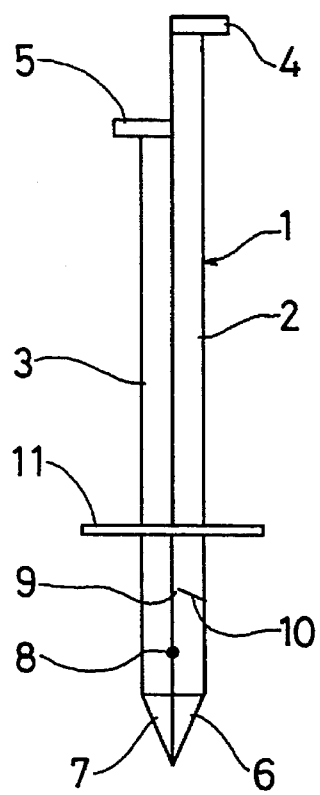
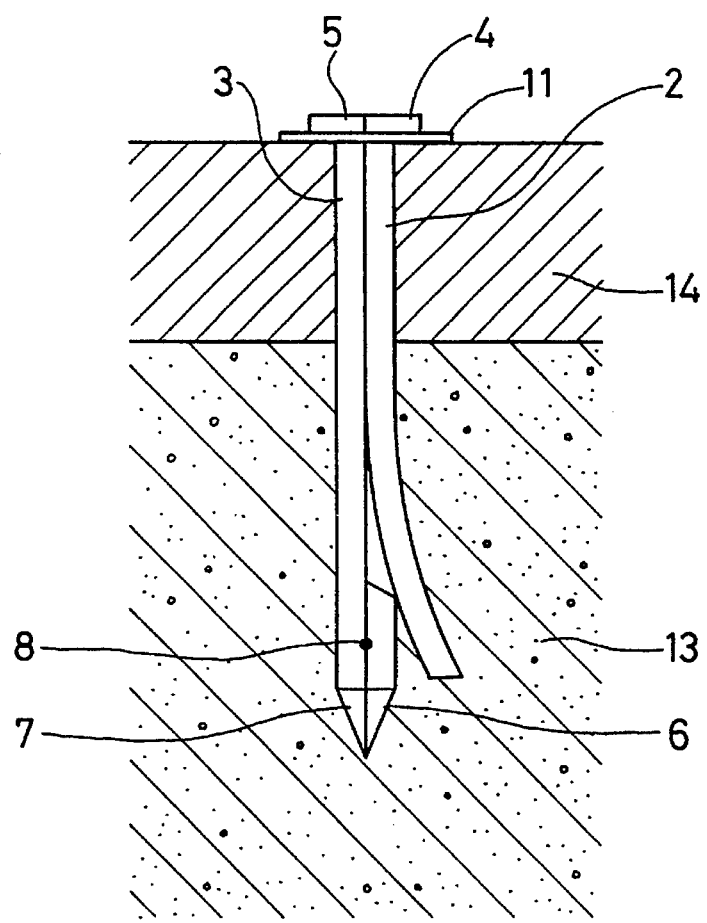

SPLIT NAIL

BACKGROUND OF THE INVENTION

This invention relates to a split nail used when mounting a wood or other material on air bubble lightweight concrete.

When mounting wood or other material on a fragile and inflexible building material such as air bubble lightweight concrete (hereinafter referred to as ALC), since an ordinary nail does not provide a sufficient force to secure these materials to each other, it is necessary to use a split nail which exhibits high resistance to pulling forces by spreading their legs when driven in.

Examined Japanese Utility Model Publication 57-19449 proposes such a split nail coupled together at their heads. Tapered surfaces are formed at the tip portions thereof opposite to each other. A strip-shaped foldable member made of metal is sandwiched between the legs. Also, a washer is fitted around the legs near their tips. When the split nail is driven into a starting hole formed in the wood or other material and the ALC, the reactive force caused by the nail acts on the tapered surfaces of the tip portions so as to split the legs gradually. The reactive force also acts on the foldable member to compress and deform it as the legs are driven in deeper. Thus, the ALC is compressed, so that the pull-out resistance increases.

Such a split nail will spread its legs by the pressure, i.e. the reactive force applied to the tapered surfaces of the legs by hitting the nail. If the ALC is too hard, the reactive force acts on the ALC so strongly that the legs are spread apart before being driven to a sufficient depth. If it is too soft, the legs cannot be spread sufficiently due to a weak reactive force of the ALC. Thus, the degree of opening will vary depending upon the hardness of the ALC.

Also, a starting hole has to be formed in the wood because the nail cannot be directly driven into the wood. This work is bothersome.

An object of this invention is to provide a split nail which provides a constant pull-out resistance by spreading its legs at a predetermined depth regardless of the hardness of the ALC and which can be driven in without the necessity of forming a starting hole.

SUMMARY OF THE INVENTION

According to the present invention, there is provided a split nail comprising a long leg and a short leg each having a head at one end and a pointed tip at the other end, the long leg and the short leg being joined together near their tips, the long leg being formed at a portion above the joint portion with a cut extending obliquely upwards toward the central axis of the split nail so that a breakable portion is formed in the long leg between the end of the cut and the contact surface between the long leg and the short leg, and a washer for clamping the legs at a portion above the cut.

By driving the split nail through the work toward the ALC by hitting the head of the long leg with a hammer, both of the legs will penetrate into the ALC guided by their tips. After having abutted the work and stopped the washer moves upwards with respect to the legs.

When the head of the short leg abuts the washer and the short leg stops, a strong force is applied to the long leg in the axial direction. The surface of the upper portion above the cut formed near the tip slides down on the surface of the lower portion. The breakable portion through which the upper and lower portions of the long leg have been connected is broken apart. Further, since the lower portion of the long leg is welded to the short leg, the upper portion will slide on the lower portion and be bent outwards. The long leg finishes spreading with its head abutting the washer.

From another aspect, the split nail of the present invention comprises a long leg and a short leg each having a head at one end and a pointed tip at the other end, the long leg and the short leg being joined together near their tips, the long leg being formed at a portion above the joint portion with a concave having a lower surface thereof extending obliquely upwards toward the central axis of the split nail so that a breakable portion is formed in the long leg between the end of the concave and the contact surface between the long leg and the short leg, and a washer for clamping the legs at a portion above the concave.

In the same manner as stated above, when the split nail is driven, the breakable portion near the concave formed in the long leg is broken. Further, since the lower portion of the long leg is welded to the short leg, the upper portion will slide on the lower portion and be bent outward. The long leg finishes spreading with its head abutting the washer.

From a still another aspect, the split nail of the present invention comprises a long leg and a short leg each having a head at one end and a pointed tip at the other end, the long leg and the short leg being joined together near their tips, the long leg having at a portion above the joint portion a cut which extends obliquely upwards toward the central axis of the split nail so as to divide the long leg into upper and lower portions, the upper portion of the long leg being attached to the short leg or to the lower portion through a breakable joint portion, and a washer for clamping the short leg and the upper portion of the long leg.

When the head of the short leg abuts the washer and the short leg stops, a strong force is applied to the long leg in the axial direction. The upper portion slides down on the surface of the lower portion. The breakable portion is cut apart. Further, since the lower portion of the long leg is welded to the short leg, the upper portion will slide on the other portion and be bent outward. The long leg finishes spreading with its head abutting the washer.

As mentioned above, the split nail in this invention will split at a predetermined depth regardless of the hardness of the ALC. Accordingly, a stable pull-out resistance is obtainable regardless of the hardness of the work and thus the work can be mounted securely. A portion below the cut of the long leg serves as a guide or as a slide, but it also serves as a wedge between the two legs. When the pull-out force is applied, the wedge will prevent the spread legs from closing. Thus, a strong pull-out resistance can be attained.

Moreover, the split nail will not spread apart until the head of the short leg abuts the washer. It makes it possible to eliminate the necessity of providing a starting hole and to directly drive the legs into the wood.

It may be used to clamp not only the ALC and the wood but also clamp the woods together. It may be used as an anchor if a starting hole is provided in the concrete.

Other features and objects of the present invention will become apparent from the following description made with reference to the accompanying drawings, in which:

BRIEF DESCRIPTION OF THE DRAWINGS

FIG. 1A is a front view of a split nail according to the first embodiment;

FIG. 1B is a vertical sectional front view of the same showing the state when it is driven;

DETAILED DESCRIPTION OF THE PREFERRED EMBODIMENT

Figure 2:
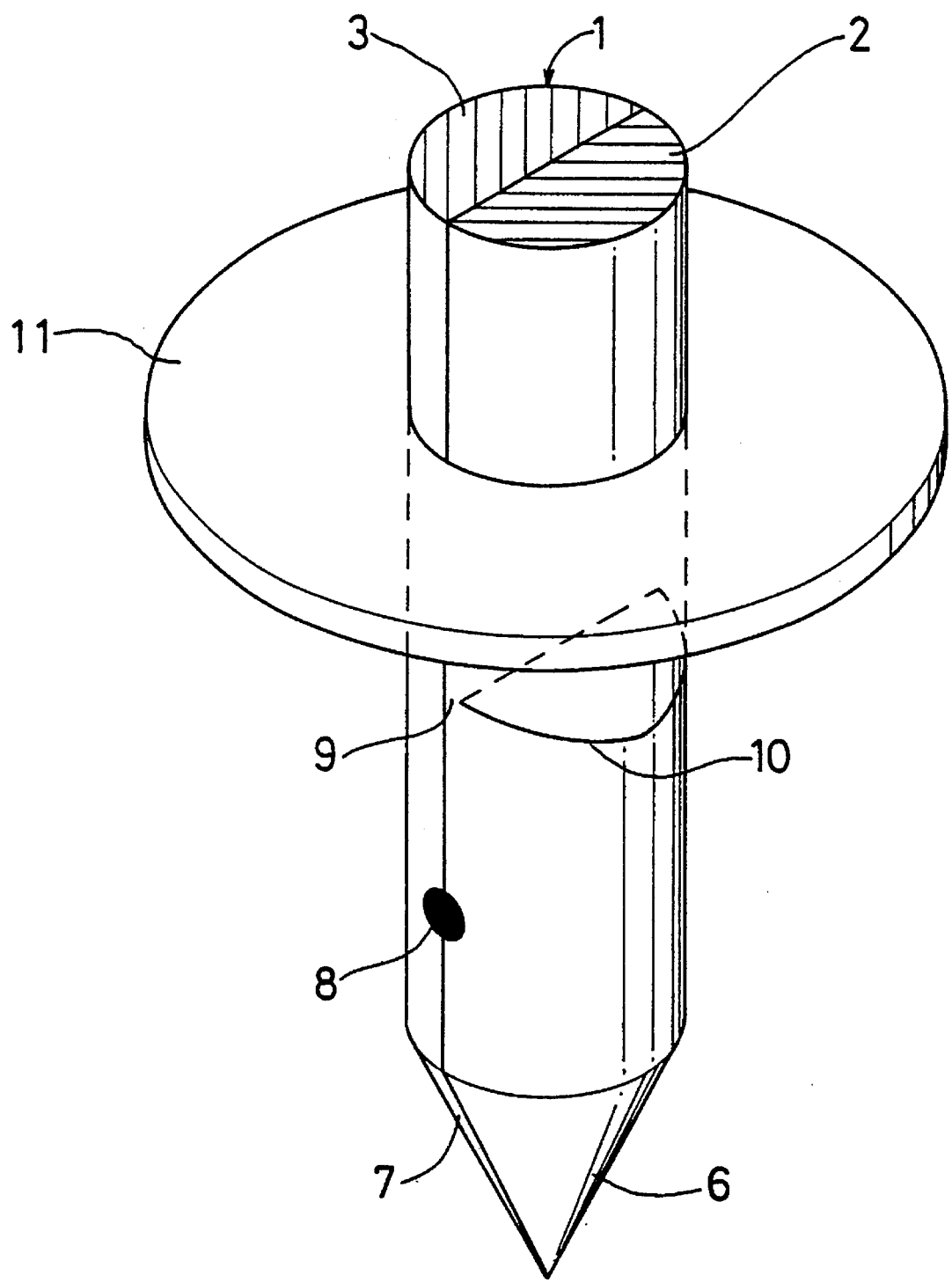
FIG. 2 is an enlarged perspective view of a portion of the same.

FIGS. 1 and 2 show a first embodiment in which a split nail 1 comprises a long leg 2 and a short leg 3 having heads 4 and 5 provided at one end of each leg at different heights and extending in opposite directions to each other, and pointed tips 6 and 7 at the other end, respectively.

The legs 2 and 3 have their sides in abutment with each other with their tips 6 and 7 forming a single tip and fixed together at 8 by welding.

Above the joint portion 8, the long leg 2 is formed with an oblique cut 10 which extends obliquely upwards from its side remote from the short leg 3 toward the short leg. The cut 10 terminates just short of the contact surface with the short leg 3 to provide a thin breakable portion 9 between the inner end of the cut 10 and the contact surface with the short leg 3.

The cut 10 is formed by cutting the long leg 2 obliquely upwards toward the short leg 3 with a cutter.

At a portion slightly above the cut 10, the legs 2 and 3 are clamped together by a washer 11. It is movable toward the heads 4 and 5 of the legs 2 and 3.

Figure 3:
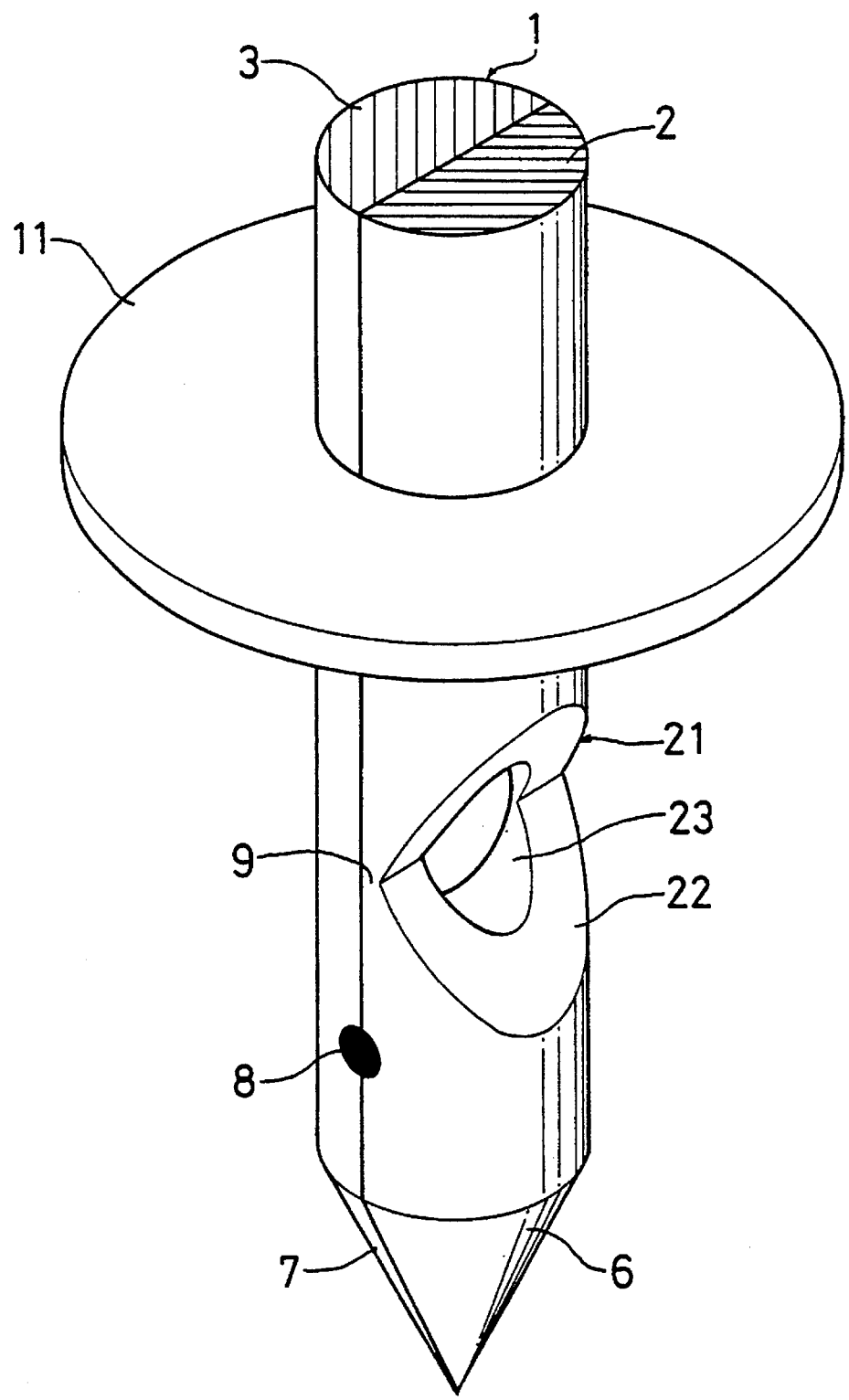
FIG. 3 is an enlarged perspective view of a portion of a split nail according to the second embodiment.
Figure 4:
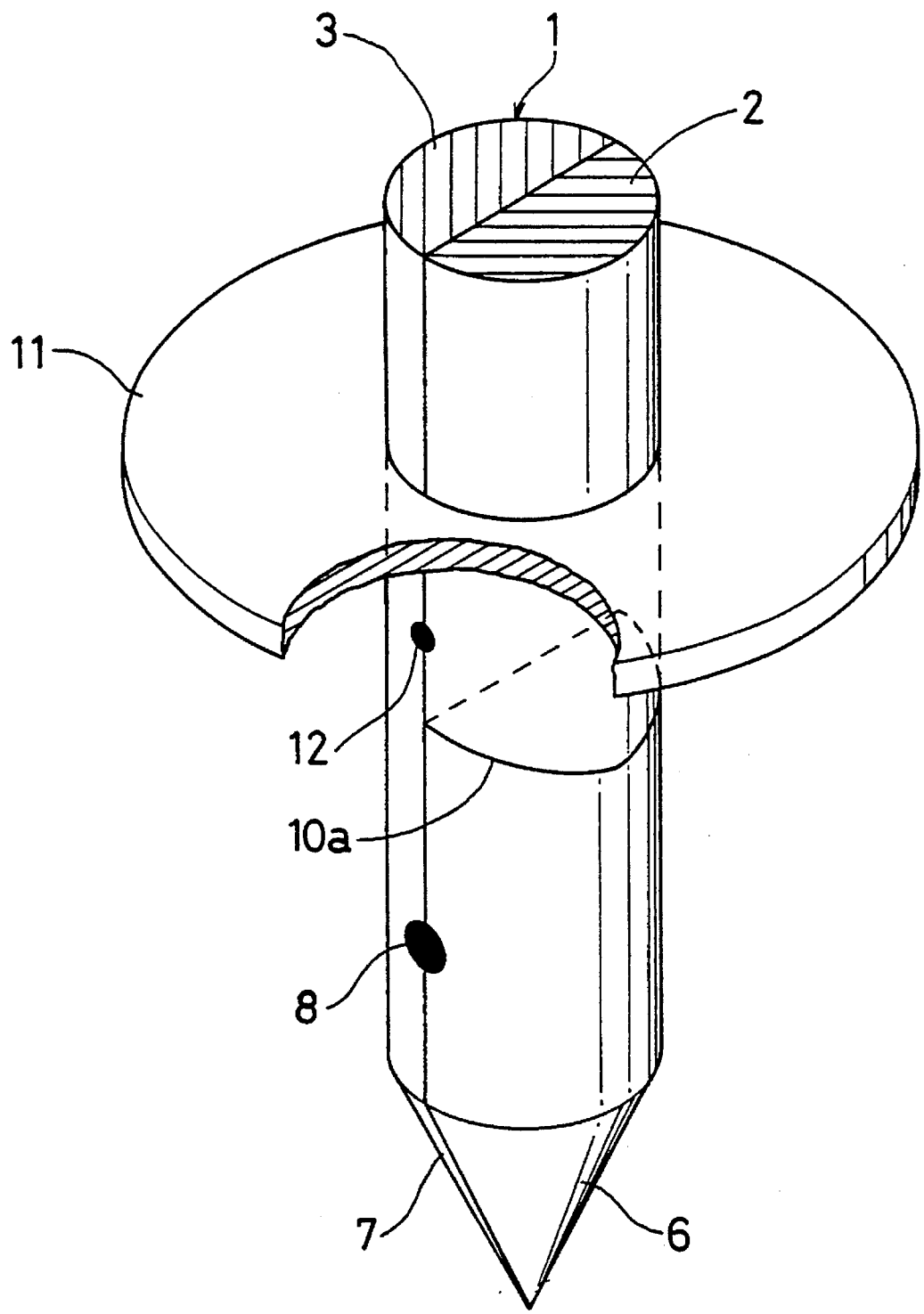
FIG. 4 is an enlarged perspective view of a portion of a split nail according to the third embodiment.

FIGS. 3 and 4 show second and third embodiments, respectively, in which like parts are denoted by like numerals and their description is omitted.

In the second embodiment shown in FIG. 3, above the welded joint portion 8, the long leg 2 has a concave 21 formed by pressing or cutting. It has a V-shape as viewed from its side. The breakable portion 9 is formed in the long leg 2 between the inner end of the concave 21 and the contact surface with the short leg 3. The concave 21 has an upper surface and a lower surface 22 which extends obliquely downwards toward the side remote from the short leg 3. A through hole 23 is formed at the center of the breakable portion 9. The rupture strength of the breakable portion 9 is determined by the size of the hole 23.

In the third embodiment shown in FIG. 4, a cut 10a extending obliquely upwards is formed to divide the long leg 2 into the tip portion and the head portion. The head portion is welded to the short leg 3 through a breakable joint portion 12 provided slightly above the cut 10a. It may be attached e.g. by welding not to the short leg 3 but to the tip portion of the long leg 2.

Although the head portion of the long leg 2 is separated from its tip portion by the cut 10a, it is retained in position by the breakable joint portion 12 and by the washer 11 mounted around the legs 2 and 3.

Now we shall explain the operation of the split nail according to this invention with reference to the first embodiment.

As shown in FIG. 1B, after placing a wood 14 upon an ALC 13, the tips 6 and 7 of the split nail 1 are held against the wood 14. By hitting the head 4 of the long leg 2 with a hammer, both of the legs 2 and 3 are driven into the wood 14 and the ALC 13 guided by the tips 6 and 7.

The portion of the long leg 2 above the cut 10 is connected to the tip portion through the breakable portion 9. Its head side is fastened to the short leg 3 by the washer 11. Thus, the legs of the split nail 1 will not spread apart while it is being driven through the wood 14.

The washer 11 abuts the outer surface of the wood 14 and stops moving downwards while the legs 2 and 3 are driven in. In other words, in this state, the washer 11 moves upwards relative to the legs 2 and 3. When the head 5 of the short leg 3 abuts the washer 11, the short leg 3 stops moving downwards and a strong force is applied to the long leg 2 in the axial direction. Since the lower portion is secured to the short leg 3 at 8 by means of welding and the cut 10 is inclined, the upper portion slides down on the surface of the lower portion. The breakable portion 9 will be broken by this force.

After the upper portion above the cut 10 has slid on the lower portion, it is bent outwardly. As shown in FIG. 1B, when the head 4 of the long leg 2 abuts the washer 11, the split nail 1 will finish splitting.

In the second embodiment shown in FIG. 3, the upper portion of the long leg 2 will slide on the oblique lower surface 22 and be bent outwards after the breakable portion 9 has gotten broken.

As stated above, the legs 2 and 3 keep moving straight until the head 5 of the short leg 3 abuts the washer 11. After the head 5 abuts the washer 11, the split nail 1 will start splitting. Regardless of the hardness of the ALC 13, the split nail 1 will start splitting at a predetermined depth. Thus, it will show a predetermined pull-out resistance.

In the third embodiment shown in FIG. 4, the long leg 2 is prevented from spreading by the breakable joint portion 12 and the washer 11 until the head of the short leg 3 abuts the washer 11. After the head of the short leg 3 abuts the washer 11, the breakable joint portion 12 will be broken due to the force produced at the cut 10a of the long leg 2. The long leg 2 will spread from the short leg 3 by this inclination of the cut 10a.

In any of the embodiments shown in the drawings, both of the legs 2 and 3 are semicircular rods, but their shape may be triangle or rectangle in section. Furthermore, in addition to the washer 11, another washer may be mounted below the head of the short leg 3.

What is claimed is:

1. A split nail comprising a long leg and a short leg each having a head at one end and a pointed tip at the other end, said long leg and said short leg being joined together near their tips, said long leg being formed at a portion above said joint portion with a cut extending obliquely upwards toward the central axis of said split nail so that a breakable portion is formed in said long leg between the end of said cut and the contact surface between said long leg and said short leg, and a washer for clamping said legs at a portion above said cut.

2. A split nail comprising a long leg and a short leg each having a head at one end and a pointed tip at the other end, said long leg and said short leg being joined together near their tips, said long leg being formed at a portion above said joint portion with a concave having a lower surface thereof extending obliquely upwards toward the central axis of said split nail so that a breakable portion is formed in said long leg between the end of said concave and the contact surface between said long leg and said short leg, and a washer for clamping said legs at a portion above said concave.

3. A split nail comprising a long leg and a short leg each having a head at one end and a pointed tip at the other end, said long leg and said short leg being joined together near their tips, said long leg having at a portion above said joint portion a cut which extends obliquely upwards toward the central axis of said split nail so as to divide said long leg into upper and lower portions, said upper portion of said long leg being attached to said short leg or to said lower portion through a breakable joint portion, and a washer for clamping said short leg and said upper portion of said long leg.

* * * * *